May 8, 1956 F. E. BRADY, JR 2,744,543
AIR CONTROL UNIT
Filed Sept. 27, 1954
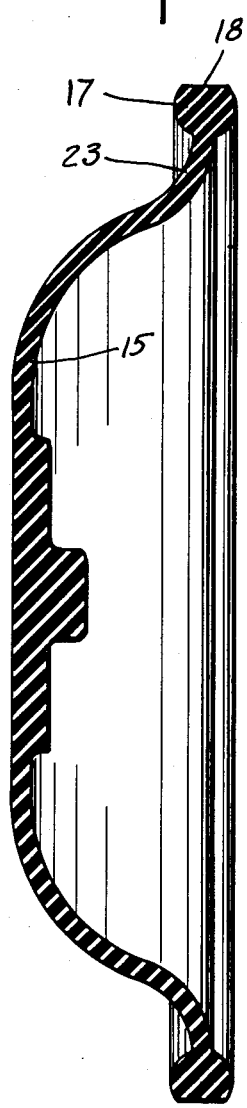
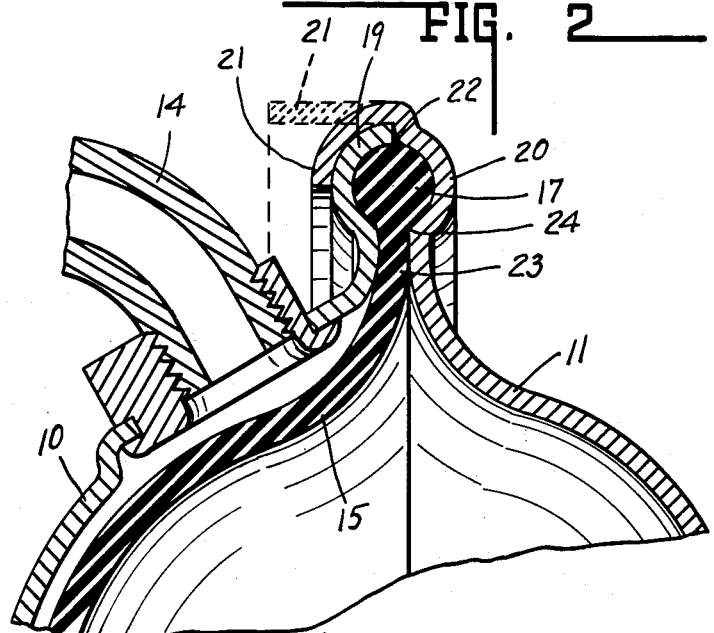
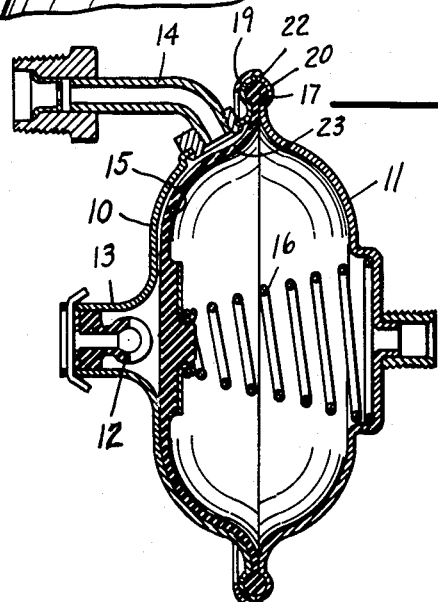
INVENTOR.
FRANCIS E. BRADY, JR.
BY
Lockwood, Galt, Woodard & Smith.
ATTORNEYS.

2,744,543
Patented May 8, 1956

2,744,543
AIR CONTROL UNIT
Francis E. Brady, Jr., Muncie, Ind.

Application September 27, 1954, Serial No. 458,508

2 Claims. (Cl. 137—791)

This invention relates to an air control unit of the character employed in storage tank water systems, and more particularly the structure of the diaphragm and housing elements for clamping it in sealed position.

Whereas the rim of the rubber diaphragm is usually clamped between the opposed side wall elements of the housing secured by an annular series of bolts, such clamping causes radially inward flow of the rubber material immediately adjacent to said opposed side wall elements. Compression or other stress and strain occurs immediately adjacent to said side wall elements, and this is at the point of flexing of the diaphragm whereby deterioration thereof rapidly occurs as a result of normal flexing and initial stress and strain created during manufacture. To overcome this difficulty this invention contemplates so forming the rim of the diaphragm in relation to the clamping rim of the housing elements that all stress and strain, due to clamping, is removed from the flexing perimeter of the diaphragm.

The above is accomplished by forming the periphery of the diaphragm with a bead having initially an outer flattened peripheral face adapted to be received and clamped between a pair of annular cupped rim portions of the housing elements to cause and permit the squeezed rubber mass to flow outwardly away from and free of the flexing perimeter instead of inwardly into it.

A further feature of the invention lies in the clamping structure of the housing side wall elements, whereby there will be provided a uniform limited clamping pressure about the beaded periphery of the diaphragm to insure free play of the flexing perimeter portion thereof without stress or fracture. Thus the vulnerable portion of the diaphragm is protected from damage due to the clamping thereof. For this purpose one of the housing elements has its peripheral portion dished to embrace one side of the bead of the diaphragm, and terminates in an annular clamping flange having a limiting shoulder adjacent thereto. Said shoulder receives and limits the abutting edge of the companion dished portion of the opposed housing element. Said limiting shoulder is positioned to permit firm clamping of the beaded periphery of the diaphragm, but leaving a spaced throat embracing the flexing perimeter of the diaphragm free of compression, stress or strain.

The full nature of the invention will be understood from the accompanying drawings and the following description and claims:

Fig. 1 is a diametrically disposed sectional view of the diaphragm before assembly.

Fig. 2 is an enlarged sectional view through a portion of the air control unit with the diaphragm assembled therein.

Fig. 3 is a section as in Fig. 2 through the entire assembled air control unit.

In the drawings there is shown an air control unit having a housing composed of a pair of opposed dished side wall elements 10 and 11. The element 10 carries a snifter valve 12 in an extended sleeve 13. Said element 10 also has a tubular connection 14 adapted for connection with a pressure tank in a water system, all in the conventional manner.

Peripherally clamped between the housing elements 10, 11 there is a diaphragm 15 of flexible material such as rubber. Said diaphragm is formed to lie adjacent the inner surface of the housing element 10 under pressure of the spring 16. The periphery of said diaphragm is formed with an enlarged bead 17 generally cylindrical in cross section other than the provision of a peripheral flattened face 18.

The housing element 10 is peripherally formed with an annular dished portion 19 somewhat cup-shaped in cross-section with a radius slightly less than that of the head 17. The opposed housing element 11 is similarly formed about its periphery at 20. However, the dished portion of the element 20 terminates in a clamping flange 21 with an intermediate annular shoulder 22 against which the outer edge of the dished portion 19 is adapted to abut.

In assembling the unit the flange 21 extends outwardly as shown by the dotted lines in Fig. 2 for receiving the diaphragm with the head 17 nesting in the dished portion 20. The dished portion 19 of the element 15 is then positioned over the opposite side of the bead 17. The bead of the diaphragm is thus embraced in nesting relation with a space between its flattened face 18 and the shoulder 22. The flange 21 is then clamped about the dished portion 19 from the dotted line position to the full line position as shown in Fig. 2. By such clamping action the rubber in the bead 17 is caused to flow outwardly under compression until the flattened face 18 is distended and deformed to fill the initially open space thereabout. Thus, the bead 17 is compressed to flow outwardly, as permitted by said space, instead of inwardly into the flexing perimeter 23 of the diaphragm.

It is further noted, in addition, that the throat portions 24 of said elements are so formed that they are maintained in spaced relation by the shoulder 22 during the clamping action so that when the bead 17 is securely clamped and deformed, the flexing perimeter 23 is not held under compression, but is entirely free thereof for flexing without compression strain or stress.

Due to the above structure the flexing perimeter of the diaphragm will be preserved from deterioration in use, giving the control unit longer life than heretofore, as above mentioned.

The invention claimed is:

1. In an air control unit a pair of side wall housing elements, each formed with opposed peripheral dished portions, a flexible diaphragm mounted between said elements having a peripheral bead provided with an initially flattened outer face, said bead being of the same generally circular contour in cross section and initially of a diameter greater than the space between the abutting dished portions of said elements, an annular clamping flange normally extending laterally from one of said dished portions to surround the opposed dished portion and be bent inwardly thereof to embracing and clamping position, and an annular shoulder provided intermediate said flange and its dished portion, said shoulder being positioned in abutting engagement by the outer edge of said opposed dished portion for maintaining said throat portions in spaced relation out of compressing engagement with the flexing perimeter of said diaphragm.

2. In an air control unit a pair of dished side wall elements, each having complementary rims generally semi-circular in cross section to provide a generally cylindrical space therebetween when clamped together, a flexible device adapted to be clamped about its periphery between said rims, said diaphragm having a peripheral bead generally circular in cross section and having a flattened outer face, said bead being slightly larger than said space whereby it will be compressed between said rims and the material thereof caused to flow radially outwardly from said flattened face into said space, said elements having throat portions inwardly of said rims, a shoulder on one of said rims engageable by the other said rim to limit the spacing of said throat portions to embrace the flexing portion of said diaphragm without compression thereof, and an outwardly extending flange on one of said elements positioned to lap over the rim of the opposed element for securing said elements in bead clamping position.

References Cited in the file of this patent

UNITED STATES PATENTS

| | | |
|---|---|---|
| 2,283,439 | Herman | May 19, 1942 |
| 2,545,857 | Perkins | Mar. 20, 1951 |
| 2,608,211 | Thorburn et al. | Aug. 26, 1952 |
| 2,684,829 | McFarland | July 27, 1954 |